March 9, 1971 M. R. BERMAN 3,568,356

TELEVISION COORDINATED PLAY KIT

Filed Feb. 3, 1969 2 Sheets-Sheet 1

INVENTOR
MORTON R. BERMAN

BY
Kirschstein, Kirschstein, Ottinger & Frank
ATTORNEYS

TELEVISION COORDINATED PLAY KIT

Filed Feb. 3, 1969 2 Sheets-Sheet 2

INVENTOR
MORTON R. BERMAN
BY
Kirschstein, Kirschstein, Ottinger & Frank
ATTORNEYS 3,568,356
TELEVISION COORDINATED PLAY KIT
Morton R. Berman, Brooklyn, N.Y., assignor to Screen Magic Inc., Hempstead, N.Y.
Filed Feb. 3, 1969, Ser. No. 795,870
Int. Cl. A63h *33/14*
U.S. Cl. 46—16 24 Claims

ABSTRACT OF THE DISCLOSURE

A play kit for coordinated use with a television series for children. The play kit includes a soft limp transparent film (hereinafter called the "panel") which is tacky on both broad surfaces thereof so that it can be self-adherent to the transparent front of a television set whereby moving images on the television screen can be viewed therethrough. The kit further includes opaque forms of a soft limp plastic sheet tacky on both broad surfaces thereof so that they can be reversibly self-adherent to the exposed front surface of the panel. Additionally, the kit includes crayons and a spinner. A child watching a television play follows the conversation of the characters with or without a running action commentary and uses the crayons and forms to add objects to the panel which are coordinated with the moving images displayed on the screen. In addition, the kit includes a playboard which duplicates a background set shown in the television program and on which the child can apply crayon markings and forms to match those on the panel. Alternately, the panel can be stripped from the television screen and transferred to the playboard.

BACKGROUND OF THE INVENTION

(1) Field of the invention

A play kit including several elements designed to be applied to a transparent panel that is superimposed on a television screen so that moving images on the screen can be viewed therethrough.

(2) Description of the prior art

It has been proposed heretofore to supply games for children in which a youngster could participate actionwise in a scene displayed on a television screen. The term "television screen" as used throughout this specification denotes a transparent generally flat surface through which a viewer sees television images. Such term, therefore, embraces (a) the display face of a cathode ray tube, which usually is of glass, having a rear surface coated with suitable phosphorescent materials that are rendered evanescently luminous as an electron beam of varying energy content traces a raster thereover; (b) a glass protective sheet which sometimes is bonded to the front face of a cathode ray tube; and (c) a protective pane of glass which is located in some television sets forwardly of the face of the cathode ray tube. Although the "television screen" has been described as generally flat, it is known in the television field that front faces of many cathode ray tubes are gently curved and such gentle curvature is included within the ambit of "generally flat" television screens as used herein.

In such prior games, the material which was furnished to the child in a kit included a plastic sheet panel of which a single surface was tacky so as to be self-adherent to a television screen. The other surface of the panel was non-adhesive. This other surface, which is the exposed front surface, would accept crayon markings that could, with difficulty be wiped off with a dry cloth.

The way such a kit was used was to apply the plastic sheet to the television screen when the television set was tuned to a series which consisted of programs that employed still pictures, that is to say, "frozen" pictures in which there was no movement, thus, in a sense, negating the prime function of television viewing, to wit, movement upon the screen. These stills usually constituted line drawings, i.e., inanimate sketches and rude characterizations, of normally animate objects such as children, people and animals, as well as similar sketches and characterizations of inanimate objects such as would be present on a background set upon which the frozen animate objects were shown. Along with this still, a speaker would supply a running narrative commentary. The child viewer would, with crayons, apply markings to the plastic sheet, which markings would remain when the still blanked out on the screen. In these prior games progressive stills were shown on the screen. The markings were not easy to remove.

However, the characters never moved nor did the characters speak. Accordingly, the play value of these games was quite insubstantial and they did not successfully hold a child's unflagging interest. The child was given no rapport or personal involvement with the frozen scene, largely due to lack of motion and also in part due to the fact that the characters did not speak. What these previous games amounted to essentially was nothing but a television tracing set, that is to say, a child in effect was placing a transparent panel over a frozen picture, and copying on the panel all or a part of the frozen scene in back of the panel. Also the trouble experienced with removing the markings detracted from the ready acceptance of the kit.

It also has been proposed to provide a kit including a playboard, that is to say, a stiff or semi-stiff flat surface such as is furnished by a sheet of paperboard or cardboard, and to also supply with the kit, self-adhering "dresses." The term "dresses" in the game industry denotes an opaque silhouette of a character or a symbol or an object or of a part of any of these. The term is believed to have derived from paper dresses which were cut out from sheets of paper and then applied, as with tabs, to cardboard dolls. Thus, these "dresses" were two-dimensional representations of three-dimensional objects which were applied to a two-dimensional representation of a three-dimensional object. The term, however, has come to be more generic and now, as above indicated, embraces any flat sheet, the profile, i.e. periphery, of which is in the configuration of some desired silhouette. The dresses usually are totally opaque although sometimes portions thereof may be transparent. The individual dresses may be of one color or, more usually, they have different colored areas or different colored lines imprinted thereon. By way of example, a "dress" may be a silhouette of a child's face viewed head on, in which case the "dress" will have imprinted thereon lines indicative of facial features such as eyes, nose, lips, hair, etc. The "dresses" of the prior art to which allusion was made above in connection with the second kit were made of flexible plastic having one face thereof treated so that the dresses were self-adhering to the playboard. The playboard was not a television screen nor was there any audio adjunct. Typically, "dresses" were heads, bodies, arms and parts of inanimate objects or single entire inanimate objects. This second kit likewise did not exert any great attraction for young children because there was no movement involved and because the child heard no speaking narrative or conversation from characters. Here, too, the child found it difficult to establish an empathy with the play of the game and quickly lost interest.

SUMMARY OF THE INVENTION

It is an object of the present invention to provide a television coordinated play kit which avoids all of the drawbacks of the prior art and for the first time supplies a kit which can be, and is, used in conjunction with a television series, the programs of which furnish for the young viewer moving speaking objects with which the child can closely associate both through audio coordination and manual coordination, the latter by drawing on a transparent panel superimposed on the television screen and placing dresses on the panel which have a specified relation to the objects and characters shown on the television screen and visible through the applied panel.

It is another object of the invention to provide a kit of the character described in which individual viewers are able to "play the game" in singular, that is to say, unique, manners which are not necessarily identical to the play of the game by other children watching the program and playing the game.

It is another object of the invention to provide a kit of the character described in which the child viewer is encouraged to exert his own ingenuity in the play of the game while he still is coordinating with the characters and objects shown on the television screen.

It is another object of the invention to provide a kit of the character described wherein a child can exert a choice between adhering appliqués ("dresses") to the panel emplaced on the television screen or applying colored lines or areas, which colored lines or areas can be removed easily either by wiping with a water dampened soft member or by dry wiping.

It is another object of the invention to provide a kit of the character described which will encourage a child to follow the action and speech shown in a television screen in connection with a program that has moving and talking characters, preferably in color, and optionally with a background narrative, so that the child will, by following the words heard, and possibly orders given by a narrator, perform certain actions not in conjunction with objects seen on the television screen through the transparent panel, e.g. actions in conjunction with dresses.

It is another object of the invention to provide a kit of the character described in which the application of colored areas or lines and subsequent removal thereof by wet or dry easy wiping leaves the transparent panel amenable to the fresh superposition of appliqués or other markings thereon. In other words, the original coloring of the exposed surface of the tacky adherent panel followed by removal of the coloring will still leave the film ready to accept appliqués to be self-adhered thereto or will accept fresh coloring.

It is another object of the invention to provide a kit of the character described which will, when desired, enable various patterns in the nature, for instance, of labyrinths, mazes, chase arrangements or play arrangements to be projected on a television screen from a transmitting station and to provide a child with a random chance selector so that the child can move markers about on the pattern which he sees on the television screen through the transparent panel whereby each viewer can play his own individual game.

It is another object of the invention to provide a kit of the character described which also includes a separate playboard on which a scene is imprinted, the scene being the same as, or generally like, a scene shown on the television screen during the course of a television program so that the child can duplicate on the playboard the application of dresses and colored markings on the transparent panel, i.e. reproduce on the playboard the same markings and appliqués that he has supplied to the transparent panel overlying the television screen. Thereby, after action has been halted on the television screen and even after the television broadcast has terminated, the child has before him a record of events which have previously transpired so that he can relive the same in his recollection and thereby enhance the play value of the game. Furthermore, with this playboard, the child can transfer the transparent panel with dresses and markings thereon back and forth between the television screen and the playboard.

It is another object of the invention to provide a kit of the character described which further includes open-face shallow molds and, for cooperation therewith, slabs of a nonhardening modelling clay which will enable a child either of his own volition, or under the guidance and or direction of the speech of a character displayed on the television screen or the running commentary of an offstage voice that he hears in connection with the television program, to form clay appliqués of various shapes which he can use by superpositioning the same on the transparent panel.

It is another object of the invention to provide a kit of the character described which constitutes relatively few and simple parts, which is inexpensive to manufacture, which lends itself to mass production at a low cost, and which can be attractively packaged and requires practically no explanation in the form of printing accompanying the kit so that even children of tender ages or just barely having acquired the facilities of visual perception, visual association and manual dexterity can follow and play the game with enjoyment.

It is another object of the invention to provide a process of playing a game which in general achieves the objects above described.

Other objects of the invention in part will be obvious and in part will be pointed out hereinafter.

The invention accordingly consists in the features of construction, combination of elements, arrangements of parts and series of steps hereinafter described and of which the scope of application will be indicated in the appended claims.

BRIEF DESCRIPTION OF THE DRAWINGS

In the accompanying drawings in which is shown one of the various possible embodiments of the invention.

DESCRIPTION OF THE PREFERRED EMBODIMENTS

Figure 3:
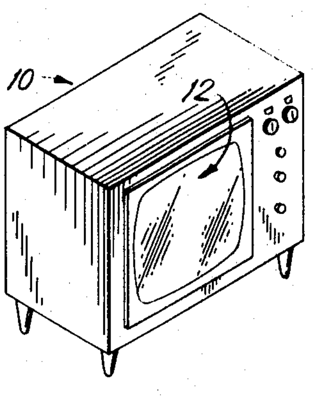
FIG. 3 is a perspective view of a television set with which the kit of the present invention is adapted to be used, it being understood that no special type or size of television set is required.

Referring now in detail to the drawings, the reference numeral 10 denotes (see FIG. 3) a conventional television set. The set illustrated happens to be a console model. It will be appreciated, of course, that the particular type of set illustrated is not a feature of the invention in that the invention can be used, for instance, with table model sets and with the so-called "theater-type" sets which also include record players, tape recorders, radios, etc.

It also should be understood that the size of the television screen is not of importance. The kit is designed to be used with any size screen, e.g. 11-inch diagonal, 18-inch diagonal and 23-inch diagonal. Also the television set may be of the colored or black and white variety, although, because many components of the kit are colored, the invention works to its maximum advantage when the television image is colored.

The television set includes a typical display means in the form of a cathode ray tube 12 having a television screen. As noted previously, the television screen is a transparent generally flat surface through which a viewer sees television images. The most common television screen is the display, i.e. front, glass wall of a cathode ray tube, the rear surface of which is coated with suitable phosphorescent materials. Optionally, the glass front face can have bonded thereto a protective pane of glass or a protective pane can be carried by the cabinet of the set immediately in front of the face of the cathode ray tube. All of these are interchangeably referred to herein as a "television screen."

The reference numeral 14 denotes a kit of the present invention. The kit includes an open-topped shallow container 16 made, for instance, of paperboard. Lying on the upper surface of the bottom wall of the container is a playboard 17 (see FIG. 2). This playboard has a background set imprinted on its exposed upper face. The set usually includes major inanimate objects and the particular objects displayed and sizes and their mutual relationship will depend upon the particular program with which it is to be used. A kit may include several playboards 17 with different materials imprinted thereon, or different kits may have different playboards, or extra playboards of a diverse variety may be packaged and sold separately for use with a kit already in a user's possession. Optionally, the edges of the playboard may include flaps, which are not here illustrated, that lie up against the inner faces of the side walls of the container and can be unfolded flat to the plane of the board expanse of the playboard to secure a slightly enlarged playboard area. In such cases, the faces of the flaps, which are coplanar with the top face of the broad expanse of the playboard, may likewise carry printing to amplify the general theme of the background set depicted on the playboard. In the illustrated playboard, the scene consists of a brook running to a pond spanned by a bridge. A tree is shown in back of the pond.

Located in the container 16, over the playboard, are the sundry other components of the kit. These include a folded panel 18, a spinner 20 and a numbered display 22. The numbered display conveniently rests on top of the folded panel and the spinner on top of the numbered display. The kit further includes a wiping cloth 24, a box of crayons 26, several slabs 28 of clay, some open-face molds 30 and a few panels 32 of dresses. Not all of these components need be included in the kit, the minimum constituents being the transparent panel 18, the wiping cloth 24, the crayons 26 and the dresses 32. It is sometimes advantageous to omit the slabs 28 of clay and, therefore, the molds 30 where the kit is distributed through the mails in order to keep the weight low. It also is sometimes desirable to omit the spinner 20 and the numbered display 22, depending upon the complexity of the television program with which the kit is to be used. Each of these items is constructed in a certain fashion which enhances the play value of the game. Their structure has not been detailed in the general statement concerning the contents of the kit, but will now be given.

Referring first to the transparent panel 18, the same is of a size large enough to cover the presently largest television screen, i.e. a screen with a 23-inch diagonal. Quite obviously, the panel can be trimmed down by a user to a smaller size if it is desired to adapt the same for use on a smaller television screen. The panel is made of a limp soft transparent synthetic plastic material. A preferred material is polyvinyl chloride. The film is quite thick, that is to say, not as thin as ordinary wrapping film, the purpose being to give the film body so that it can assume and retain a substantially flat configuration when emplaced on the front of a television screen. Preferably, both surfaces of the sheet are polished, that is to say, have been given a final calendering between polish rolls whereby both surfaces of the panel 18 are quite smooth.

Figure 1:
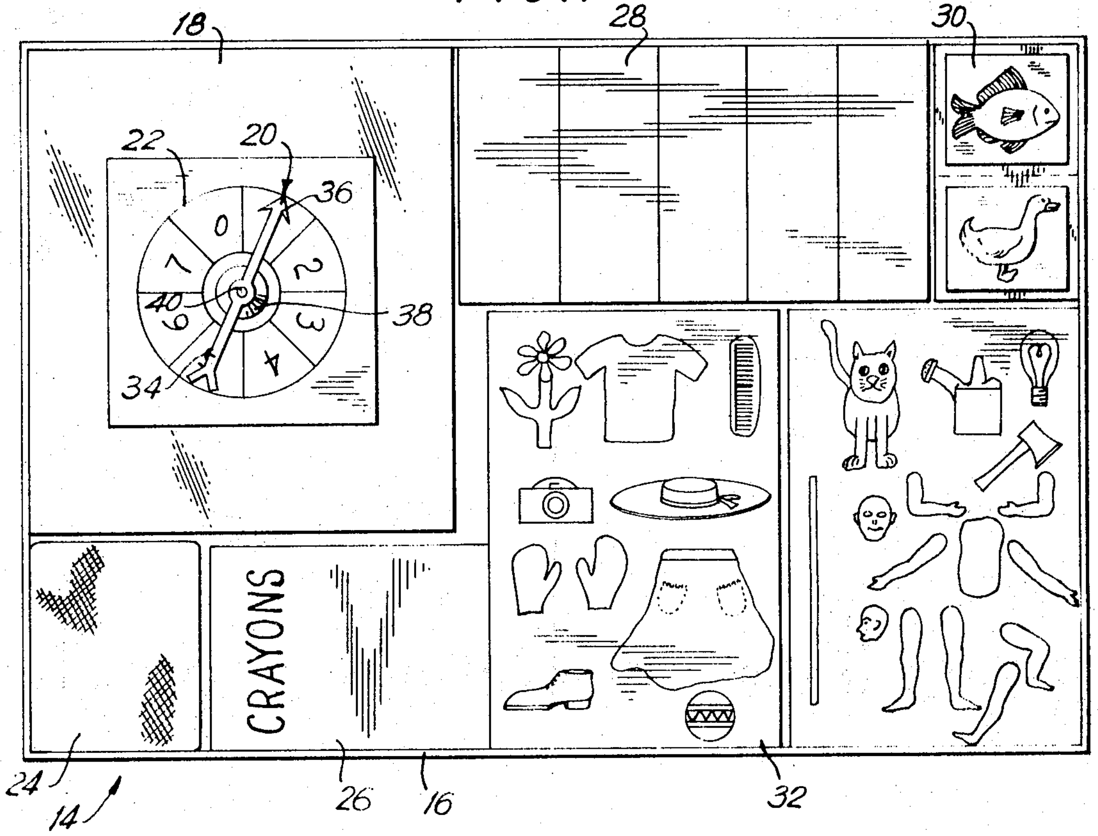
FIG. 1 is a plan view of a kit embodying the components of the present invention, the kit being illustrated with all the components located in a shallow open-topped box which is the container for the same.

Although the panel is transparent, it has been found that the play value of the kit and the game played therewith is enhanced if the panel is lightly tinted. A preferable tint is pink. The tint should not be outstandingly noticeable when the panel is positioned on a television screen so that it does not impair the image or the colors of the image on the television screen. However, pink does lend a somewhat rosy glow to the images viewed and leave the user with a warmer more empathetic feeling. The color is really only noticeable when the panel is folded up into a small compass as shown in FIG. 1 for the purpose of stowage. The color is so light that it is essentially subliminal, i.e. barely at the threshold of conscious attention. By way of example, a typical thickness for the polyvinyl panel is 9 mils.

An ordinary polyvinyl chloride sheet has broad surfaces which are essentially non-adherent. However, pursuant to the present invention, both broad surfaces of the panel 18 must be adherent, i.e. self-adherent, so that when they are applied to a smooth surface, such for instance as a glass surface or a similar surface of another plastic sheet, the two will cohere simply upon being placed together and without the necessity of applying any substantial pressure. An ordinary polyvinyl chloride sheet includes a plasticizer in order to render the sheet supple and limp. A conventional plasticizer for this purpose is dibutyl phthalate in an amount of 3% to 5% by weight of the sheet. In accordance with the present invention, the sheet is rendered self-adherent on both broad surfaces thereof by making the surfaces slightly tacky and this is accomplished by raising the concentration of the plasticizer. Specifically, the polyvinyl chloride panel of the present invention contains from about 8% to about 10% by weight of dibutyl phthalate, 9% being preferred. When a sheet such as this is placed flatly against a television screen and smoothed over with the palms of a user's hand so as to remove wrinkles, it will be found that the panel is self-adherent to the television screen. It is pertinent to note at this point that the tacky surface of the panel obtained in the foregoing manner is inherent within the material of the panel so that if markings are applied to the surface and subsequently are removed, as they are during the play of the game, said surface remains self-adherent, this particularly being the case where the markings have good release characteristics as will seem to be true of the markings left by the crayons 26 later to be described in detail.

The spinner 20 constitutes an indicator needle 34 having a head 36 and rotatably supported at approximately its center of gravity on a suction cup 38, as by an eyelet 40, the eyelet serving as an axis of rotation for the needle. By virtue of the suction cup 38, the spinner can be attached to the panel 18 or to the playboard 17. The spinner also can be attached by the same mechanism to the numbered display panel 22. This numbered display panel constitutes a stiff board, e.g. cardboard or paperboard, on which there are imprinted a circular array of numbered areas so that when the spinner is implanted at the center of the display and twirled, a randomly selected number can be read off from the rest position of the spinner.

The wiping cloth 24 is of any bibulous soft fibrous material, a preferred cloth being flannel. Suitable alternates are cotton, wool, facial tissue, toilet tissue and paper towels. The wiping pad, like the panel 18, can be folded into a small compass so as to take up minimal space within the container 16.

The crayons 26 are characterized by a certain feature which makes them peculiarly useful in connection with the present invention. Essentially, this feature is that the crayons will leave a marking, i.e. a thin film, by ablation, which film can be wiped off easily by a water-dampened cloth or by a dry cloth and which will furthermore have a good release characteristic, that is to say, will adhere to the tacky surface of the polyvinyl chloride panel 18 and yet have the capability of being readily and completely wiped from the panel in either of the foregoing manners so as to leave the freshly exposed surface of the panel tacky and self-adherent ready for acceptance of some other marking or of a dress.

An ordinary wax crayon such as used heretofore does not have this characteristic. A typical wax crayon constitutes from about 170 to 200 parts by weight of paraffin wax which acts as the matrix, i.e. carrier, from about 1 to 10 parts by weight of a desired coloring pigment and from 10 to 20 parts by weight of a coupling agent which binds the pigment to the carrier. The usual coupling agent is stearic acid. Such a standard crayon is not suitable for use in connection with the present invention since it would adhere too well to the panel 18 and could not be conveniently removed therefrom by either a water-dampened or a dry wiping cloth although it can be dry wiped off with difficulty.

The crayons 26, which are of assorted colors, are, pursuant to the present invention, made up of the following constituents:

| Ingredient | Parts by weight | Preferred parts by weight |
|---|---|---|
| Paraffin wax (fully refined and having an oil content of less than ½% and a melting point of 143° to 145° F.) | 150–220 | 180 |
| Stearic acid (coupling agent) | 5–25 | 15 |
| Surface active agent | 5–25 | 18 |
| Microcrystalline wax (melting point 180° F.) | 3–12 | 7½ |
| Petrolatum (amber) | 3–20 | 10 |
| Pigment | 5–15 | 10 |

The surface active agent lowers the surface tension of the wax film applied to the panel in the use of the crayon and thereby makes the film water-dispersible when wiped under light pressure by a water-dampened cloth or the like. The petrolatum functions as a lubricating agent and imparts a greasy characteristic to a wax film left by the crayon so as to facilitate the ability of the thin applied wax layer to be wiped off the panel 18 with a dry cloth or the like. The presence of the petrolatum and the surface active agent somewhat soften the paraffin wax which is the carrier and main constituent of the crayon and in order to restore the desired degree of hardness so that the crayon will not soften and be distorted by body heat when held in a child's hand, the microcrystalline wax is incorporated, this latter wax being a hardening agent.

The preferred surface active agent is an 85% active (15% inert) polypropylene glycol ether of a block polymer of about 50% propylene oxide and 50% ethylene oxide having a molecular weight of about 3,000.

The particular type of surface active agent is not critical to the practice of the invention, that is to say, cationic, anionic and non-ionic surfactants and blends thereof can be used. Simply by way of example there are set forth below other suitable surfactants.

(1) An ester of orthophosphoric acid and a compound selected from the group consisting of ethoxylated aliphatic alcohols and ethoxylated alkyl phenols, which is a member of the series of phosphated ethoxylated aliphatic alcohols and alkyl phenols, being a mixture of mono- and di- phosphate esters, having the formula

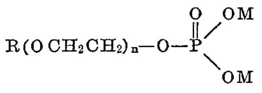

for the mono-phosphate ester, and the formula

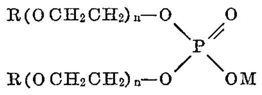

for the di-phosphate ester, where R is a member selected from the group consisting of alkyl phenol residues and aliphatic alcohol residues in which the non-aromatic portions thereof have from 8 to 24 carbon atoms, preferably are saturated and are branched and unbranched, M is H, Na, K or $NH_3$, and $n$ is an integer from 1 to 20.

There may be employed either the mono- or di-phosphate ester or mixtures thereof in any proportions.

The ethoxylation should be between 40% and 90% and preferably is between 60% and 70%. Typical examples of phenols employed are nonyl phenols and dinonyl phenols. Typical alcohols that may be employed are dodecyl alcohol and tridecyl alcohol.

Specific examples of phosphorylated ethoxylated esters are a mixture of the free acid forms of mono- and di-phosphate esters of ethoxylated tridecyl alcohol, commercially available from General Aniline as Gafac RS 610 which has a 60% to 70% ethoxylation, a mixture of the free acid forms of mono- and di-phosphate esters of ethoxylated nonyl phenol which has a 60% to 70% ethoxylation, sold as Gafac RE 610, and a mixture of the free acid forms of mono- and di-phosphate esters of ethoxylated dinonyl phenol which has a 60% to 70% ethoxylation, commercially available from Wayland Chemical Company as Alkapent M 60.

Other satisfactory materials are mixtures of the free acid forms, and sodium, potassium and ammonium salts of mono- and di-phosphate esters of ethoxylated nonyl phenol, ethoxylated dinonyl phenol, and ethoxylated dodecyl alcohol.

Other satisfactory commercial compounds are Alkapent DP 60 and Alkapent TD 100.

(2) A polyethoxylated mono- or di-amine having the formula

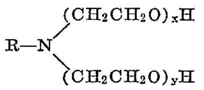

for the polyethoxylated monoamine, where $x+y$ is an integer ranging from 2 to 50 and where R is a long chain fatty acid residue having from 8 to 18 carbon atoms in the carbon chain, which preferably are unbranched, and which usually are a mixture of saturated and unsaturated chains as is common in naturally occurring products, and the formula

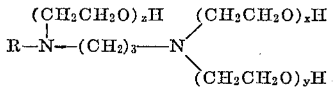

for the polyethoxylated diamine, where $x+y+z$ is an integer ranging from 3 to 80 and preferably is from 3 to 15, R being the same as defined for the polyethoxylated monoamine.

Specific examples of polyethoxylated amines are the ethylene oxide condensation products of N-tallow trimethylene diamine, commercially available from Armour Industrial Chemical Co. as Ethoduomeen T 25 which is a diamine wherein $x+y+z$ is 15, Ethoduomeen T 20 a diamine wherein $x+y+z$ is 10, and Ethoduomeen T 13 a diamine wherein $x+y+z$ is 3.

Other satisfactory polyethoxylated amines are stearyl polyethoxylated amines having $x+y$ from 2 to 50, soya bean polyethoxylated amines having $x+y$ from 2 to 15, oleyl polyethoxylated amines having $x+y$ from 2 to 5, coco polyethoxylated amines having $x+y$ from 2 to 15, and tallow polyethoxylated amines having $x+y$ from 2 to 15, all commercially available from Armour Industrial Chemical Company under the name of Ethomeens.

(3) An alkyl sulfate ester, i.e. a fatty alcohol sulfate, to wit, a sulfate ester of a fatty alcohol, wherein the alkyl residue contains from 8 to 18 carbon atoms in the carbon chain. The ester preferably, but not necessarily, is neutralized. The alkyl sulfate ester has the formula $RSO_4M$, where R is an alkyl or branched fatty acid residue, either saturated or unsaturated, containing from 8 to 18 carbon atoms in the carbon chain and M is a member of the group consisting of Na and triethanolamine.

A specific example of an alkyl sulfate ester is triethanolamine lauryl sulfate. Other satisfactory materials are sodium lauryl sulfate, sodium tridecyl sulfate, triethanolamine tridecyl sulfate, sodium 2-ethyl hexyl sulfate, sodium octyl sulfate, triethanolamine octyl sulfate, sodium undecyl sulfate, sodium tridecyl sulfate, and triethanolamine tridecyl sulfate.

(4) A fatty amine, being a compound selected from the class consisting of primary fatty amines, secondary fatty amines and tertiary fatty amines, the amines being both saturated and unsaturated, primary fatty amines being preferred. The fatty amine has the formula $$N \begin{cases} R_1 \\ -R_2 \\ R_3 \end{cases}$$

where $R_1$ is a member selected from the group consisting of an unbranched fatty acid residue containing from 8 to 18 carbon atoms in the carbon chain and hydrogenated derivatives thereof and butyric acid, and each of $R_2$ and $R_3$ is a member selected from the group consisting of H, $CH_3$ and an unbranched fatty acid residue containing from 8 to 18 carbon atoms in the carbon chain and hydrogenated derivatives thereof.

A specific example of a fatty amine is distilled octyl amine, commerically available from Armour Industrial Chemical Company as Armeen 8D. Other suitable fatty amines are dodecyl amine, hexadecyl amine, octadecyl amine, decyl amine, tallow amine, di- N- octyl amine, tri-N-octyl amine, dimethyl dodecyl amine, methyl dihydrogenated tallow amine, dicoco amine, dihydrogenated tallow amine and N-coco beta aminobutyric acid.

The slabs 28 of the clay are formed of a standard non-hardening modelling clay material which is conventional in the art. The different slabs preferably are differently colored. It has been found that this conventional clay, which is sold for use in molding and modelling kits, has the property of adhering to the tacky surface of the panel 18 and furthermore, when it lifts from the panel, it lifts cleanly so as to leave the tacky surface ready to have adhered thereto a dress or to have a crayon marking applied. If small particles of clay remain when a blob of clay is applied to and then removed from the panel 18, the particles can be wiped off to leave a tacky surface which, for all effects, functions as well as the original virgin tacky surface that is provided immediately following the finishing calendering operation.

The molds 30 are in the form of open-topped shallow trays, the bottom of each of which is formed with an impression in the shape of some article to be associated with the television program. Moreover, the side edges of the molds may, for convenience, be provided with flanges, thus facilitating the handling thereof. Typical articles are those illustrated, to wit, a fish and a duck. The molds can be made from any suitable material, for example, sheet material such for instance as steel or aluminum, and in the illustrated kit 14 the molds are formed from sheet plastic, specifically cellulose acetate. If desired, the surface of the mold against which the clay is pressed to form a shape can be coated with a layer of release material such as silicone or quilone.

The panels 32 of dresses are, like the panel 18, formed of sheet material, preferably a limp soft material. Desirably, also, this material is compatible with the material of the panel 18. Conveniently, accordingly, the panels 32 are fashioned from polyvinyl chloride. The sheet is made sufficiently heavy so that portions thereof can be handled as later will be specified. A suitable thickness for this is 9 mils, which is the same as the thickness of the panel 18.

In the preferred embodiment of the invention, the panels 32 are opaque and to this end may have incorporated therein an opaque filler, such for instance as talc or diatomaceous earths. Additionally, it is desirable to color the panels 32 and for such purpose a suitable dye can be incorporated. These are so conventional that they will not be here specified.

The panels 32 provide the substances for the "dresses." Several of these dresses are illustrated in FIG. 1. Each dress is in the silhouette, i.e. profile, of some article or animate object or part of an animate or inanimate object. The dresses are fully cut out of the panels 32, i.e. their profiles are die cut out of the panels, so that the dresses can be simply peeled out of the panels or, optionally, the profiles may be in the form of a series of perforated lines joined by very narrow strips so that the dresses will tend to remain in place more easily and yet can easily be stripped away from the panels. Still further for the purpose of conveniene in packaging and use, each of the panels 32 may be backed up by a paperboard card, i.e. a stiff card.

The panels 32 like the panel 18 are provided with two tacky faces, this being accomplished in the same manner as with the panel 18, that is to say, by raising the level of the plasticizer, i.e. the dibutyl phthalate, to a level for instance, of 9% by weight. The panels thereby can be reversibly self-adhered to be supported by the paperboard sheet, which sheet may have the surface to which a panel is adhered coated with a release layer as of a silicone or quilone.

Typical profile configurations for the different dresses mentioned, it being understood that these are purely by way of example and are in no sense to be taken as limitative, are: a plant, a T-shirt, a brush, a camera, a sailor hat, a wide brimmed straw hat, a pair of mittens, an apron, a shoe, a ball, a fishing rod, a cat, a watering can, a bulb, a hatchet, a torso, various pairs of arms in different attitudes and various pairs of legs in different attitudes. In addition to the bare profiles of articles and objects, it is helpful for some of the or all of the dresses to include markings in order to enhance the resemblance of the dresses to an article or an animate object or a part thereof. For instance, referring to the plant, it will be seen that the flower petals are shown by lines on the top flat surface representation of the plant. In the camera, the lens and the view finder are likewise shown by imprinted lines. In the hat, the shallow crown and the ribbon which surrounds the base of the crown are shown by imprinted lines. In the shoe, the top of the heel, the top of the sole and the laces are shown by imprinted lines. In the apron, the top of the pockets, the stitches and the waistband are shown by imprinted lines. In the ball, an ornamental design is shown by imprinted lines. In the cat, the eyes, nose, mouth, whiskers, top of the forelegs and toes are shown by imprinted lines. Optionally, different parts of the dresses may be differently colored to bring out different features of the articles or objects which they are supposed to resemble and it is within the scope of the invention to have portions of one or more of the dresses transparent as for instance the representation of the glass envelope on the bulb could be transparent and there could be a black line running around the periphery of the said envelope, as well as imprinted lines to denote a screw base. It will be appreciated that where a portion of a dress is transparent, usually the entire panel including that dress will be fabricated from a transparent plastic and there will be a coloring layer applied to one or both broad faces of the panel where the dress is to be colored, inasmuch as it is economically not feasible to form plastic sheeting with specific delinated transparent and adjacent opaque areas, except by coloring the opaque areas after the sheet has been formed.

Mention also should be made of the fact that the playboard 17 has its upper surface covered with a lamination of transparent plastic material, preferably the same plastic material as is employed for the panel 18 and the dress panels 32, so as to be compatible therewith. Thus, the lamination cover panel for the playboard in the kit being described is polyvinyl chloride. The exposed surface of the laminated cover for the playboard 17 is tacky so as to be self-adherent, and, once again for this purpose, it is convenient to provide the tackiness by including an added amount of plasticizer dibutyl phthalate so that the same is present in the amount of about 9% by weight.

The kit is susceptible of a wide variety of uses in conjunction with a television program. In general, the idea is that a scene will be shown on a television screen, preferably a colored scene. The scene will include a background set and from time to time characters and articles will appear on the television screen. The characters will move about, possibly not continuously, but from time to time. Also, the characters will speak. This does not preclude the use of a running commentary by a narrator. Of course, objects which are not actually as articulate as, for example, animals, will, because of the imaginative value of the game, be permitted to talk, as indeed they do in cartoon television programs. Preferably, the articles and characters are in line or rough characterization form, that is to say, the articles and characters will desirably not be still or moving photographs.

The general purpose of the kit is to permit a child viewer to become an audience participant, so to speak, of the play or program which is being watched and enacted on the television screen. The child actually takes part in the action by performing manual assignments which will become apparent to him as he watches and listens to the television program which is progressing on his television screen. Thus, a character may say "and now I will put on my hat." The child, on hearing this, will take the hat dress off its supporting panel and place it on the character's head. The child will see the character on the television screen through the panel 18 which he has flatly laid on the television screen prior to playing with the kit. The character from the television screen is visible through the transparent panel and the exposed surface of the panel is tacky as are both broad surfaces of the hat dress. Therefore, the child has no difficulty in adhering the dress to the panel directly on the character's head.

It may be that the action directed is such that the child will place a character on the panel 18 against the background set which is part of the television program in which case the child will assemble the parts of the character and carefully superimpose them on the panel stuck to his television screen. Thus, the narrator may say, "and now Rob Roy walks on to the bridge"; in which case the child playing at home will take a head, a torso, a pair of arms and a pair of legs and place them at an end of the bridge, assembling them in such fashion and picking such arms and legs as to create a realistic small boy on the transparent panel.

Another possibility is that the character appearing on the screen may say "Oh, look. A duck just sat on the lake." This will be the signal for the child watching the game to take a piece of clay from one of the slabs 28 and press it into the duck mold to form a duck which he then pulls out and sets on to the surface of the pond which is a part of the background set projected onto his television screen and visible through the transparent panel 18.

It will be appreciated that there are an infinite variety of scenarios and actions so that a child's interest will be held from day to day, week to week and month to month over an extended television series.

Simply by way of example, there are shown in FIGS. 4 through 7 a successive series of views of a television screen with the panel 18 in place and with certain objects and actions shown thereon.

Figure 2:
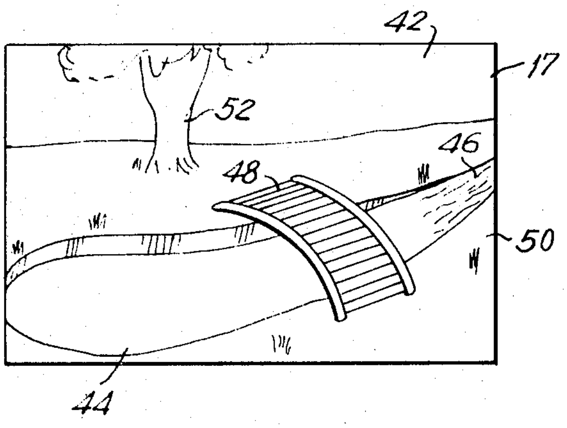
FIG. 2 is a plan view of the playboard which is a component of the kit and which, like the other components, is initially disposed in the container; the playboard cannot be seen in FIG. 1 because it is covered by other components, the playboard being situated on the bottom of the container.

In FIG. 2, there is illustrated a typical background set. This background set of FIG. 2 happens to be the one on the playboard 17. It also corresponds to the initial background set which is displayed on the home viewer's television screen and seen through the panel 18 in FIG. 4. In this specific background set, which is simply exemplificative, there is a sky 42, a pond 44, a rill 46, which runs into the pond, a foot bridge 48 spanning the pond, ground

50 alongside of the pond and rill, and a tree 52 represented as growing in back of the pond.

In a typical narration, a commentator would say, "It is early springtime and a daisy is growing near the tree to the left of it." This amounts to an instruction for the child to pull the flower dress off a panel 32, place it on the panel 18 and press it against the panel to which it will then be self-adherent. The child will use his own ingenuity as to the particular placing of the daisy dress.

Figures 4, 5, 6, 7:
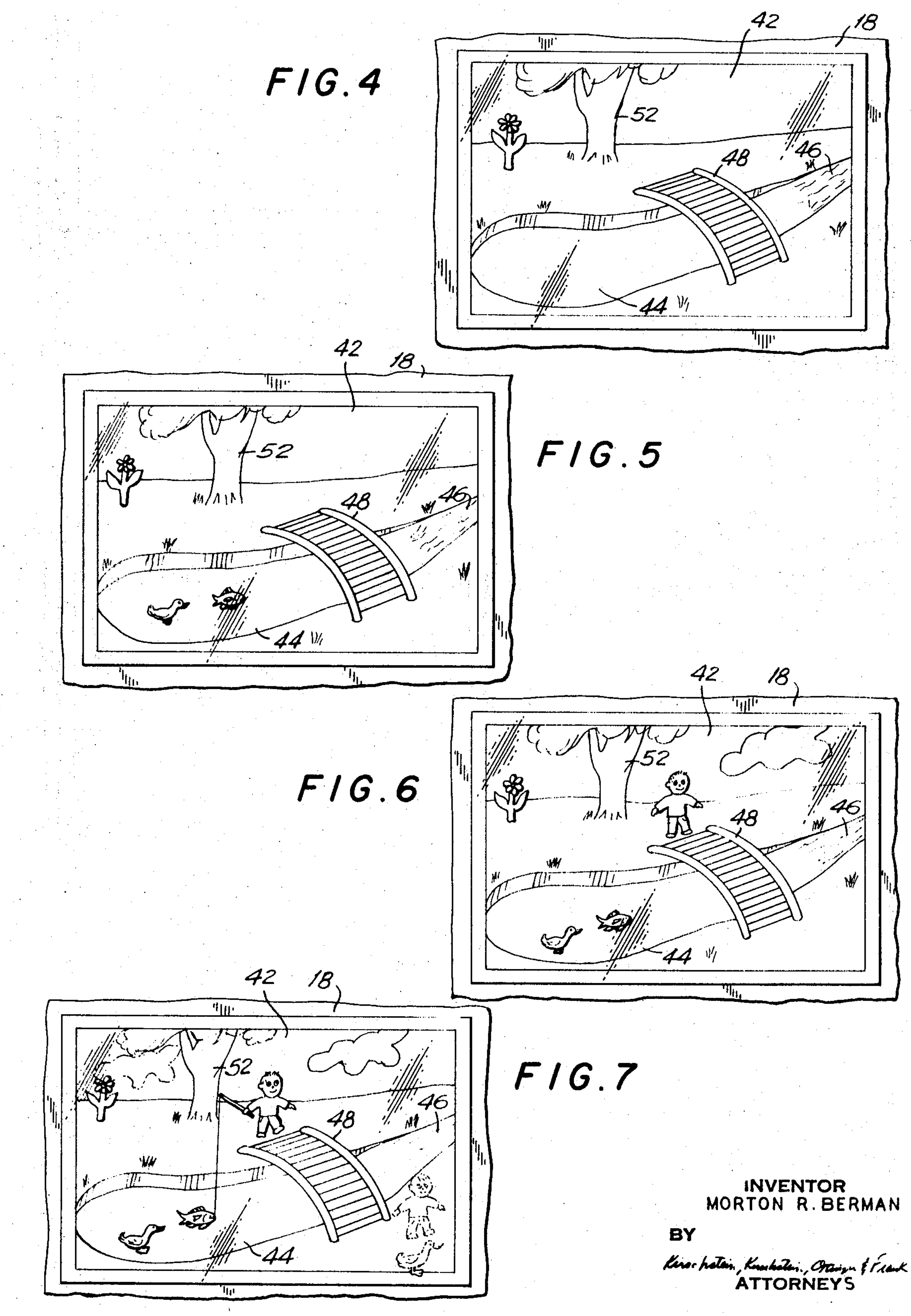
FIG. 4 is a typical scene on a television screen with the panel of the invention in play and with one "dress" applied thereto.
FIGS. 5, 6 and 7 are scenes similar to FIG. 4, but illustrating successive changes in the scene and in the dress placements.

Now the narrator may say, "A fish has swum down the brook into the pond and a duck has sat on the pond." Once again this is a signal for the child to put a fish and a duck in the pond. In this particular instance, the fish and the duck are not included among the dresses but they are included among the clay molds so that the child will mold these two objects and put them where he thinks they ought to be on the pond as shown in FIG. 5.

At this point, the child sees animation on the screen. A little boy—Rob Roy—strolls across the background set, finally arriving at the bridge where he stands still in FIG. 6 and starts to talk. It will be observed that at this point instead of the running commentary coming from an off-the-set narrator, a visible character starts to speak so that the instructions for the play of the game with the aid of the kit now come from the character whereby the child experiences a closer rapport with the game and is more closely integrated into the enactment of the television program taking place in front of his eyes, i.e. becomes a vicarious participant.

Typical of the audience involvement and the instructions issuing from a character's mouth is a sentence such as the following. "Rob Roy takes up a fishing pole and tries to catch the fish." Upon hearing this, the child plucks the fishing pole dress from a panel 32 and adheres it on the panel 18 in the location he thinks is a proper position for Rob Roy (the television small boy) to hold the pole in order to catch the fish.

It will be noted that at this point all Rob Roy has is a fishing pole. There still is no string extending from the fishing pole to the fish as shown in FIG. 6. Now the crayons come into the play. Rob Roy will say, "I have a green fishing string." This is a cue for the child viewer/player to pick up a green crayon from the box 26 and carefully draw a line from the tip of the fishing pole, held by the small boy, to the mouth of the fish. It will be recalled that the marking left by the crayon can easily be removed by wet or dry wiping and will still leave an essentially virgin tacky surface. At the moment, however, the crayon marking is in place and is useful for the progress of the scene which is now taking place. Another possible instruction at this time is for the character or the offstage voice to say, "The sun has come out. Rob Roy's suit has changed its color from blue to yellow." Originally the character shown in the television screen or which was affixed thereto by the child had a blue colored shirt and trousers; but upon hearing the turn of events coming over the audio portion of the television, the child now will pick up the yellow crayon and will with it carefully color the shirt and trousers, overcoloring the color on the television screen or the original color of the dress.

It will be appreciated that it would have been possible for an offstage voice to simply have said that Rob Roy starts to cross the bridge and the small boy might not have been shown on the television screen. However, the child could assemble the boy by appropriate arrangement of dress parts.

If desired, any of these dress parts can be colored by the child. This is distinct and not to be confused with crayon coloring of the panel 18 itself. The former is the coloring of the dresses. The latter is the coloring of the panel.

Now the boy or the offstage voice might say, "Rob Roy walks across the bridge and the duck follows him." The actual walking may take place by animate walking of the boy character as projected upon the television screen, or, if the boy character is in the form of an assembly of component dresses, the child will strip these dresses off from one side of the bridge and reassemble them on the other side of the bridge as shown in the dot-and-dash lines in FIG. 7. The child will also strip off the clay duck from its location on the pond and place it alongside of the boy character, likewise shown in dot-and-dash lines in FIG. 7.

It is to be observed that in the foregoing sequence, the former crayon marking for the fishing string remains so that the child next picks up the wiping pad 24 and wipes off this thin layer of coloring in the form of a string. The wiping can be performed either with a water dampened cloth or with a dry cloth. The constitution of the crayons is such that the thin film of crayon is sufficiently greasy to be wiped off dry and is sufficiently water dispersible to be wiped off with a water-wetted cloth. Similarly, if the child has colored portions of some object which has moved, the movement being of the television projected character, and thereby colored areas are left, these colored areas likewise can be wiped off with the cloth 24.

Although a bridge has been shown as part of the background scene projected on the television screen by the television set, it may be mentioned, in order to demonstrate the versatility of the game, as played with the kit of the present invention, that the child could have drawn this bridge in place with a crayon.

It is also possible, because of the fact that dresses are used which include parts of entire objects, for the child to perform unrealistic acts, that is to say, acts which do not occur in real life but which occur frequently in television cartoons. For instance, if the child has placed the boy character on the panel by assembling component parts, a voice from the set purporting to speak for the character may say, "I have lost my head," whereupon the child viewer will peel off the character's head. In other words, the dresses can be shifted about in any way that the offstage narrator directs or that any of the human or nonhuman characters direct or may say in their conversation. Whatever the story theme is, it will be carried out by the child viewer so that he becomes totally interested and engrossed in the play of the game.

Other possibilities may be readily envisioned. A typical one is for the kit to be used to play a chase game or a labyrinth game. For instance, the scene projected on the television screen may be that of a labyrinth or a chase game. There may be more than one path so as to accommodate several players or there may be only one path for a single player and the path may contain all kinds of obstacles, as do commercial games of this nature. The child can use a dress as a marker and he can advance the marker along the labyrinth or chase pattern by use of a chance selector such as the spinner 20. Two possibilities exist. One is to include on the scene shown on the television screen a numbered display. The child will see this numbered display through the transparent panel 18. He will be told to, or he will of his own accord, affix the suction cup 38 to the center of the numbered display and then, upon instructions, he will spin the needle 34 and wherever its head comes to rest, he will read off the number and advance his marker appropriately. Thus, each child playing the game will play the game differently from other viewers because the chance selector is random in nature whereby each child will succesively advance his marker the amounts his particular chance selector shows.

The other alternative is for the child to use the numbered display 22 provided with the kit; in which case once again the play of the game by the child is still unique to each particular player.

It also is within the scope of the invention for the child to play the game directly on the playboard 17 instead of on the panel 18.

It further is within the ambit of the invention for the child to play the game with the panel 18 attached to the television set and at anytime, but usually at the end of the program, for the child to transfer the panel 18 to the playboard 17 with whatever dressings and crayon markings are then on the panel 18 so that the child can thereafter study the panel over the playboard 17 and experience sustained enjoyment and indeed even make up his own play after the particular segment of the television series has terminated.

Of course, it will be appreciated that the background scene shown in the attached figures is only one of a large number. Other favorite scenes are those in which there is a housboat or ark or in which a dog accompanies the child character.

It further is contemplated that paperboard cutout appliques be provided or made by the child and applied to the molded clay objects and figures following the theme of some one of the television program segments.

In order to give a better idea of the breadth of the invention, there are set forth below synopses of different episodes of a television series using a kit of the present invention although not necessarily the particular background scene as shown in the accompanying drawings.

FOLLOW THE NOTES

When a villain steals all the musical notes so that a symphony orchestra cannot play, the child viewers draw a red traffic light to stop him. Then with their crayons, they trace over a note which subsequently becomes an earphone for a dog to help locate the villain who is in hiding. The dog starts to sing and when he reaches a high C fragments the villain's musical note stealing machine.

A RAMBLING BROOK

A villainous character adds land to a mythical kingdom by damming up a creek and causing it to flow further to the west. After the boy character and his dog friend are put into a dungeon for objecting, the child viewers draw hair and a crown which are supposedly the hair and crown of the emperor of the mythical kingdom and which the dog character wears as a disguise to gain his freedom and that of his boy master. The child viewers subsequently draw a castle bridge which later becomes a bulldozer that helps the boy character to restore the creek to its undammed position.

It thus will be seen that there are provided a television coordinated play kit and method of using same which achieve the several objects of this invention and which are well adapted to meet the conditions of practical use.

As various possible embodiments might be made of the above invention and as various changes might be made in the embodiment set forth, it is to be understood that all matter herein described or shown in the accompanying drawings is to be interpreted as illustrative and not in a limiting sense.

Having thus described the invention, there is claimed as new and desired to be secured by Letters Patent:

1. A play kit for coordinated use with a television screen on which there is projected a children's series, said kit including a soft limp transparent panel which is tacky on both broad surfaces thereof so as to be self-adherent to the television screen and whereby moving images on the screen can be viewed therethrough, the kit further including opaque silhouette dresses of a soft limp plastic sheet material tacky on both broad surfaces thereof so as to be reversibly self-adherent to the exposed front surface of the panel, said kit additionally including means for marking said panel surface comprising a water dispersible dry-wipe-offable crayon and a wiping pad.

2. A kit as set forth in claim 1 wherein the panel is tinted.

3. A kit as set forth in claim 1 wherein the panel is tinted pink.

4. A kit as set forth in claim 1 wherein the panel is constituted of polyvinyl chloride.

5. A kit as set forth in claim 4 wherein the panel is more than normally plasticized.

6. A kit as set forth in claim 4 wherein the panel is plasticized with from about 8% to about 10% by weight of dibutyl phthalate.

7. A kit as set forth in claim 1 wherein the dresses are constituted of polyvinyl chloride.

8. A kit as set forth in claim 7 wherein the dresses are more than normally plasticized.

9. A kit as set forth in claim 7 wherein the dresses are plasticized with from about 8% to about 10% by weight of dibutyl phthalate.

10. A kit as set forth in claim 1 wherein the crayon constitutes a wax base, a pigment, a coupling agent, a surface active agent and a grease.

11. A kit as set forth in claim 10 wherein the surface active agent is a propylyene glycol ether of a block polymer of about 50% propylene oxide and about 50% ethylene oxide having a molecular weight of about 3,000.

12. A kit as set forth in claim 10 wherein the grease is petrolatum.

13. A kit as set forth in claim 10 wherein the grease is amber petrolatum.

14. A kit as set forth in claim 10 wherein the wax base is paraffin wax.

15. A kit as set forth in claim 14 which further includes a hardening agent.

16. A kit as set forth in claim 15 wherein the hardening agent is microcrystalline wax.

17. A kit as set forth in claim 1 wherein the crayon constitutes

| | Parts by weight |
|---|---|
| Paraffin wax (fully refined and having an oil content of less than ½% and a melting point of 143° F. to 145° F.) | 150–220 |
| Stearic acid | 5–25 |
| Surface active agent | 5–25 |
| Microcrystalline wax (melting point 180° F.) | 3–12 |
| Amber petrolatum | 3–20 |
| Pigment | 5–15 |

18. A play kit as set forth in claim 1 in which the wiping pad is bibulous.

19. A play kit as set forth in claim 1 which further includes a playboard having a scene imprinted on a broad surface thereof.

20. A play kit as set forth in claim 19 in which the broad printed surface of the playboard has a transparent plastic sheet laminated thereon, the exposed surface of the sheet being tacky so as to be adherent to the panel and the dresses.

21. A play kit as set forth in claim 20 wherein the sheet is constituted of polyvinyl chloride.

22. A play kit as set forth in claim 21 wherein the sheet is more than normally plasticized.

23. A play kit as set forth in claim 21 wherein the sheet is plasticized with from about 8% to about 10% of dibutyl phthalate.

24. A play kit as set forth in claim 1 which further includes non-hardening and open-faced molds used with the clay to form appliqués for placement on the panel adhered to the television screen.

References Cited

UNITED STATES PATENTS 2,586,939 2/1952 Heggedal ............ 40—125

FOREIGN PATENTS 1,198,344 6/1958 France ............... 35—28

F. BARRY SHAY, Primary Examiner

U.S. Cl. X.R.

35—26; 106—19; 161—164; 273—134